United States Patent
Le Roux

(10) Patent No.: US 9,411,485 B2
(45) Date of Patent: Aug. 9, 2016

(54) METHOD FOR DISPLAYING THE GEOGRAPHICAL SITUATION OF AN AIRCRAFT

(71) Applicant: Thales, Neuilly sur Seine (FR)

(72) Inventor: Yannick Le Roux, St Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 142 days.

(21) Appl. No.: 13/949,164

(22) Filed: Jul. 23, 2013

(65) Prior Publication Data

US 2014/0033107 A1      Jan. 30, 2014

(30) Foreign Application Priority Data

Jul. 27, 2012   (FR) ...................................... 12 02126

(51) Int. Cl.
   *G06F 3/0481* (2013.01)
   *G08G 5/00* (2006.01)
   *G01C 23/00* (2006.01)

(52) U.S. Cl.
   CPC .............. *G06F 3/0481* (2013.01); *G01C 23/00* (2013.01); *G08G 5/0026* (2013.01)

(58) Field of Classification Search
   CPC ..... G08G 5/0021; G08G 5/065; G08G 5/025; G08G 5/0013; G08G 5/0078; G08G 5/0026; G08G 5/0043; G08G 5/0056; G08G 5/0082; G08G 5/02; G06F 3/14
   See application file for complete search history.

(56) References Cited

U.S. PATENT DOCUMENTS

| 4,825,374 A | * | 4/1989 | King | ................... G05D 1/0676 244/186 |
| 5,041,982 A | * | 8/1991 | Rathnam | ................ G01C 23/00 340/995.26 |

(Continued)

FOREIGN PATENT DOCUMENTS

WO    WO 2006/106211 A1    10/2006

OTHER PUBLICATIONS

Buening, Ulrich; Tactical Mapping Aircraft; IEEE; © 1988; 5 pages.*

(Continued)

*Primary Examiner* — Linh K Pham
(74) *Attorney, Agent, or Firm* — Blakely, Sokoloff, Taylor & Zafman LLP

(57) ABSTRACT

The general field of the invention is that of methods for displaying the geographical situation of an aircraft in flight on a visual display device. The geographical situation comprises a cartographic representation of the terrain flown over by the aircraft. Said geographical situation comprises two main display modes, known as "Arc" and "Rose". The switch from the first mode to the second mode is made at least by means of a first step of selecting a model representing the position of the aircraft at the current time and arranged in the first mode and a second step of moving said model towards the position occupied in the second mode. The movement of the model causes the movement of the cartographic representation of the terrain being flown over, the steps of selection and movement being accomplished using a human-machine interface, which can be a graphic cursor control device or a touch-sensitive interface.

18 Claims, 3 Drawing Sheets

(56) References Cited

U.S. PATENT DOCUMENTS

| | | | | |
|---|---|---|---|---|
| 6,285,298 B1* | 9/2001 | Gordon | ............ | G05B 9/03 340/945 |
| 6,690,298 B1* | 2/2004 | Barber | ............ | G01C 23/005 340/971 |
| 6,868,320 B1* | 3/2005 | Burch | ............ | G01C 23/00 340/995.27 |
| 7,280,896 B2* | 10/2007 | Morizet | ............ | G01C 23/005 244/158.1 |
| 7,817,065 B2* | 10/2010 | Fetzmann | ............ | G01C 21/00 340/971 |
| 2002/0008640 A1 | 1/2002 | Horvath et al. | | |
| 2003/0179215 A1* | 9/2003 | Coldefy | ............ | G08G 5/0013 345/619 |
| 2008/0147315 A1* | 6/2008 | Fetzmann | ............ | G05D 1/0083 701/408 |
| 2008/0154442 A1* | 6/2008 | Wipplinger | ............ | G01C 23/00 701/3 |
| 2008/0211692 A1* | 9/2008 | Fetzmann | ............ | G01C 21/00 340/972 |
| 2009/0055767 A1* | 2/2009 | Cabaret | ............ | G01C 23/00 715/771 |
| 2009/0153343 A1* | 6/2009 | Shafaat | ............ | G01C 23/005 340/686.1 |
| 2011/0246003 A1* | 10/2011 | Lafon | ............ | G08G 5/0021 701/16 |
| 2012/0299752 A1* | 11/2012 | Mahmoud | ............ | G08G 5/0082 340/972 |
| 2013/0088435 A1* | 4/2013 | Sia | ............ | G01C 23/00 345/173 |
| 2013/0166189 A1* | 6/2013 | Michel | ............ | G08G 5/065 701/120 |
| 2013/0268878 A1* | 10/2013 | Le Roux | ............ | G09B 9/08 715/772 |

OTHER PUBLICATIONS

Srikanth Kamineni, et al., "Electronic Moving Map of Airport Surface on Electronic Flight Bag," XP010764988, Digital Avionics Systems Conference, vol. 1, pp. 4.C.3-1 to 4.C.3-9 (Oct. 24, 2004).

French Search Report for Counterpart French Patent Application No. 12302126, 11 pgs. (Apr. 30, 2013).

* cited by examiner

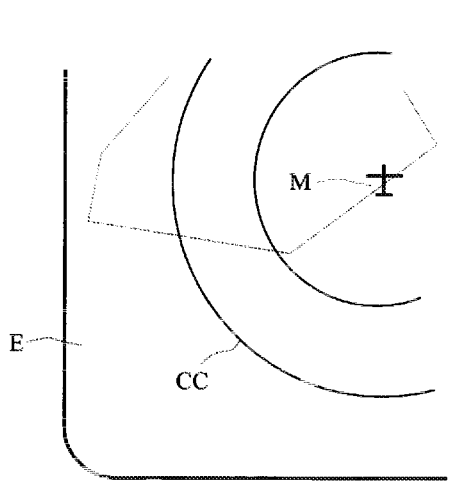
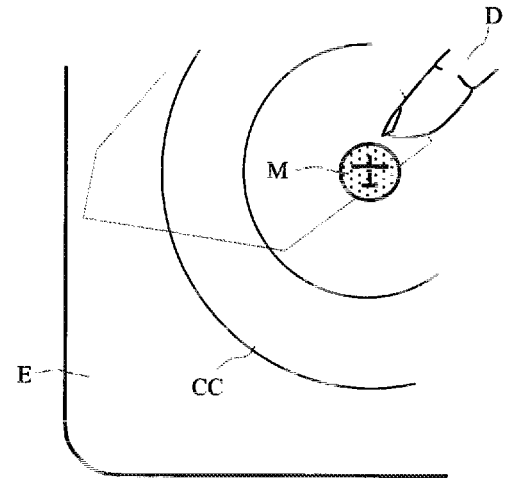
FIG. 6　　　　FIG. 7
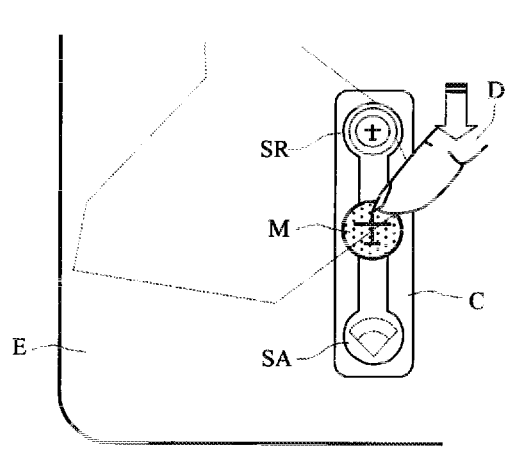
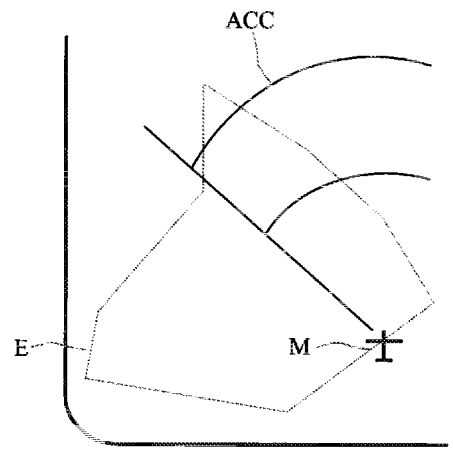
FIG. 8　　　　FIG. 9

METHOD FOR DISPLAYING THE GEOGRAPHICAL SITUATION OF AN AIRCRAFT

BACKGROUND OF THE INVENTION

1. Field of the Invention

The field of the invention is that of cockpit display systems for aircraft. Modern cockpits are provided with visual display systems comprising complex windowing, making it possible to show several display areas on the same screen simultaneously. Each type of display can be shown in several different ways according to the phase of flight and the flight conditions.

2. Description of the Prior Art

One of the most important representations for the crew is that concerning management of the navigation of the aircraft. This window is frequently called "Navigation Display" or "ND". This window presents a model of the aircraft, around and below which are displayed the terrain data, called the base map, corresponding to the aircraft position, the flight plan or plans for the aircraft, information concerning the aircraft itself or its means of navigation.

This representation can generally be configured into different types of display. There are two main modes of representation, called "Arc" mode and "Rose" mode. In "Arc" mode, the model of the aircraft is situated at the bottom of the screen and the cartographic data are those situated in front of the aircraft. In "Rose" mode model of the aircraft is situated in the centre of the screen and the cartographic data are those situated all around the aircraft. Obviously, both representations are useful. "Rose" mode provides an overall view of the surroundings of the aircraft. "Arc" mode makes it possible to anticipate the future flight path. As a general rule, the switch from an "Arc"-type representation to a "Rose"-type representation is made using a control button or a hardware selector switch arranged in the cockpit.

FIGS. 1, 2, and 3 illustrate this selection. FIG. 1 schematically shows an aircraft instrument panel comprising six visual display units and a control panel arranged above the instrument panel and comprising a plurality of control positions CP. In FIG. 1, the control position CP in bold lines comprises a selection button B for the desired mode. In FIG. 1, the screen ND displaying the "Navigation Display" window is on the left-hand side of the instrument panel. It is also shown in bold lines. FIG. 2 shows an enlarged view of the control position and the screen displaying the "Navigation Display" window. In this figure, the selector switch B is on "ARC" mode and the window shown clearly displays a model M of the aircraft situated at the bottom of the screen and cartographic data situated in front of the aircraft. When the pilot turns the selector switch B to "ROSE" mode, the graphical representation changes. The model M of the aircraft is now situated at the centre of the screen and the cartographic data are those situated all around the aircraft.

This type of selection has several drawbacks. It is necessary to have one selector per representation of the geographical situation of the navigation of the aircraft. Currently there is one representation on each side of the cockpit, and therefore one associated selector switch on each side of the instrument panel. This drawback can be mitigated by replacing the physical buttons with virtual graphic buttons arranged on the display screens and making it possible to select the desired representation mode, by using graphic pointers, for example. These buttons are sometimes included in multiple-choice menus. This solution has the drawback of adding graphic "tools" to the desired cartographic representation, tools which, most of the time, are only useful when the pilot wishes to change graphical representation. Finally, the abrupt switch from one mode to another is not necessarily the most ergonomic for the pilot.

SUMMARY OF THE INVENTION

The method for displaying the geographical situation of an aircraft according to the invention does not present these drawbacks. The method consists in acting directly on the representation of the aircraft to choose the type of representation, by "moving" the aircraft vertically in order to choose the most appropriate type of representation, "Arc" or "Rose".

More precisely, the subject of the invention is a method for displaying the geographical situation of an aircraft in flight on a visual display device comprising a human-machine interface, said geographical situation comprising a cartographic representation of the terrain flown over by the aircraft, said geographical situation also comprising two main display modes, the first mode, known as "Arc", comprising a symbol representing the aircraft, called "model", said symbol being situated at the bottom of the cartographic representation of the terrain flown over by the aircraft, in the space occupied by the aircraft at the current time and in a first position designated "Arc Position";

the second mode, known as "Rose", comprising the model, said model being situated at the centre of the cartographic representation of the terrain flown over by the aircraft, in the space occupied by the aircraft at the current time and in a second position designated "Rose Position";

characterized in that the switch from the first mode to the second mode is made at least by means of a first step of selecting the model arranged in the "Arc Position" and a second step of moving said model towards the "Rose Position", and in that the switch from the second mode to the first mode is made at least by means of a first step of selecting the model arranged in the "Rose Position" and a second step of moving said model towards the "Arc Position", the movement of the model causing the movement of the cartographic representation of the terrain flown over by the aircraft, the steps of selection and movement being taken by means of the human-machine interface.

Advantageously, the first step of selecting the model causes a path linking the "Arc Position" to the "Rose Position" to appear, said path disappearing when the model is positioned on the "Arc Position" or on the "Rose Position".

Advantageously, as a function of the initial speed of movement imparted to the model by the human-machine interface, the model switches from one mode to the other in an automatic or continuous manner.

Advantageously, the human-machine interface is a graphic cursor control device or a touch-sensitive interface.

BRIEF DESCRIPTION OF THE DRAWINGS

The invention will be better understood, and other advantages will appear, upon reading the following non-limiting description and using the appended figures, among which:

FIGS. 4, 5 and 6 show the various steps of the method according to the invention during the switch from "Arc" mode to "Rose" mode;

FIGS. 7, 8 and 9 show the various steps of the method according to the invention during the switch from "Rose" mode to "Arc" mode.

DETAILED DESCRIPTION

The method for displaying the geographical situation of an aircraft in flight according to the invention is implemented in a modern avionic system. The latter comprises at least one cockpit visual display device, a human-machine interface and a computer environment making it possible to display on the screen of the visual display device a cartographic representation of the terrain flown over by the aircraft and the symbol sets specific to the two modes of representation and "Rose" and "Arc". These systems exist on all modern aircraft. By way of example, the human-machine interface can be a device controlling a cursor or a graphic pointer (CCD or Cursor Control Device), the equivalent of the computer "mouse". It can also be a touch-sensitive interface. The touch-sensitive interface presents the advantage of allowing intuitive and rapid implementation of the method without adding graphic control interfaces.

The method essentially comprises two steps, a first step of selecting or designating the model representing the aircraft and a second step of moving said model on the screen of the visual display device to allow a change of mode. The advantage of the change of mode is that it optimizes the portion of the terrain flown over according to the flight constraints. Thus, in "Arc" mode, the pilot sees the maximum amount of terrain laid out in front of his aircraft, enabling him to better comprehend his flight plan. "Rose" mode allows him to have a 360-degree view of his environment. When interaction on the model begins, a particular symbol set in the form of a path prompts and accompanies the user in his movement.

By way of non-limiting example, FIGS. 4 to 9 show the various steps of the method according to the invention. These figures show a part of a visual display unit E. This unit comprises a touch-sensitive surface that is not shown in the various figures. The interactions with this touch-sensitive surface are symbolized by a finger D. These figures in wireframe representation comply with the requirements for patent drawings. In reality, the terrain flown over is shown in colour according to the classic conventions specific to cartographic representation. The various symbol sets are shown in colour and/or in semitransparency in such a way as to obtain the best possible ergonomics.

Figure 1:
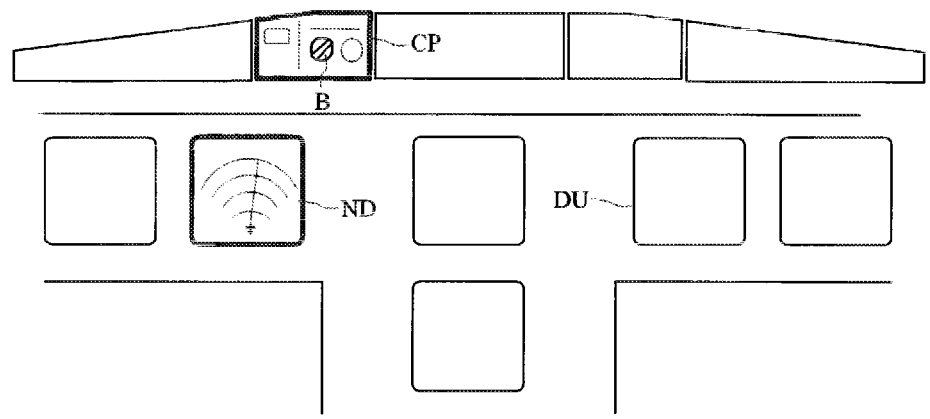
FIG. 1 shows an aircraft cockpit instrument panel with these control means.
Figure 2:
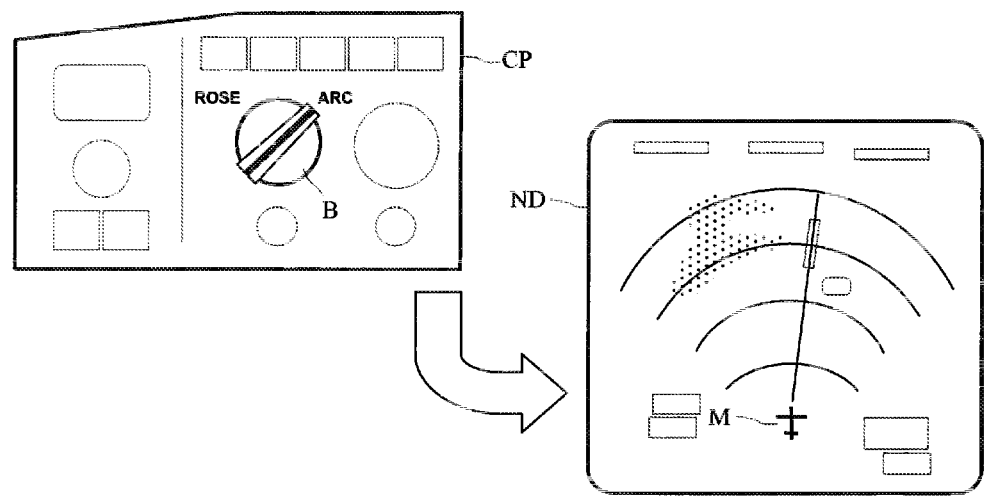
FIG. 2 shows the control and display of the "Arc" representation mode.
Figure 3:
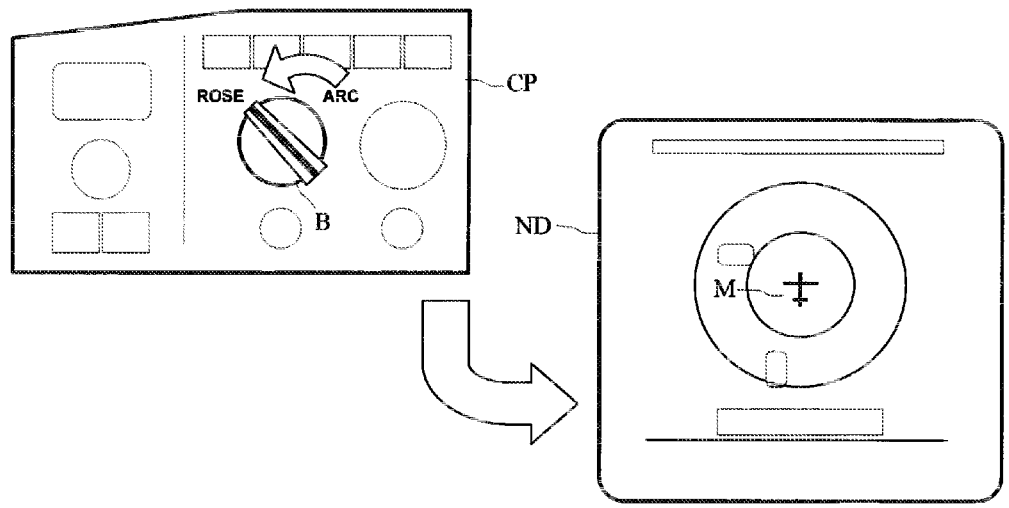
FIG. 3 shows the control and display of the "Rose" representation mode.
Figures 4, 5:
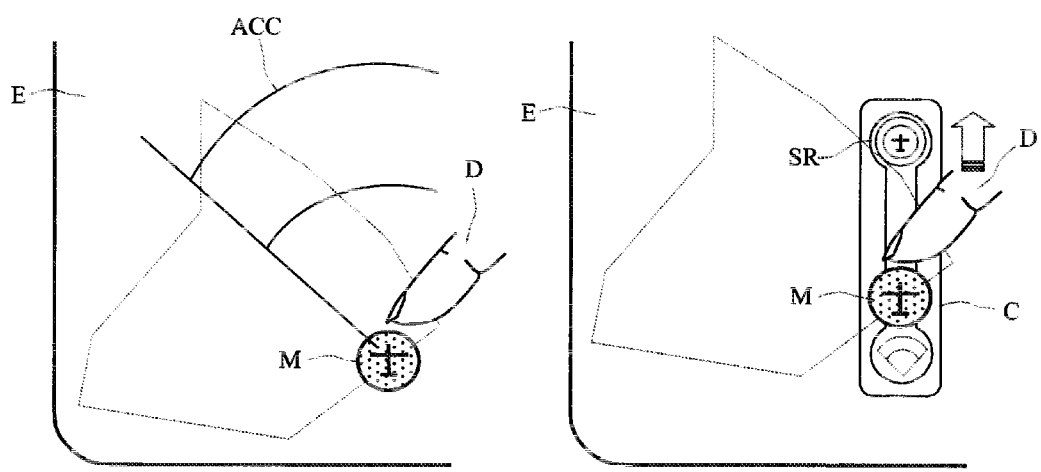

FIGS. 4, 5 and 6 show the method for switching from Arc mode to Rose mode. In a first step illustrated in FIG. 4, the user selects the model M representing the position of the aircraft above the terrain flown over at the current time in Arc mode. This mode generally comprises concentric circle arcs ACC centred on the model M and representing predetermined distances to the aircraft. This model M comprises, by way of example, a stylized aircraft. This selection can be made, for example, by prolonged pressure from the user's finger or by a double tap. The selection mode is chosen in such a way as to avoid untimely selections. This selection causes a path C linking the "Arc Position" of the model to the "Rose Position" of this same model to appear. This path can comprise a symbol set SR representing the Rose position. This symbol set SR is, for example, a stylized aircraft surrounded by concentric circles.

In a second step shown in FIG. 5, the user moves his finger along the path causing the movement of the model M, of the terrain being flown over and of the symbol set specific to Arc mode. If the initial impulse has a speed or acceleration above a predetermined value, the model moves automatically to the other end of the path C, causing the switch to "Rose" mode. This mode generally comprises concentric circles CC centred on the model M and representing predetermined distances to the aircraft. If the initial impulse has a speed or acceleration below this predetermined value, the model follows the finger of the user, who can thus switch continuously from one mode to the other, or even return to the initial mode. In all cases, the path C disappears when the model is positioned on the "Arc Position" or on the "Rose Position" as seen in FIG. 6.

FIGS. 7, 8 and 9 show the method for switching in the reverse direction from Rose mode to Arc mode. In the same manner, in a first step illustrated in FIG. 7, the user selects the model M representing the position of the aircraft above the terrain flown over at the current time in Rose mode. This selection causes the same path C linking the "Rose Position" of the model to the "Arc Position" of this same model to appear. This path can comprise a symbol set SA representing the Arc position. This symbol set SA is, for example, a set of concentric circle arcs centred on a common point.

In a second step shown in FIG. 8, the user moves his finger along the path causing the movement of the model M, of the terrain being flown over and of the symbol set specific to Rose mode. Here again, if the initial impulse has a speed or acceleration above a predetermined value, the model moves automatically to the other end of the path C, causing the switch to "Arc" mode. If the initial impulse has a speed or acceleration below this predetermined value, the model follows the finger of the user, who can thus switch continuously from one mode to the other. In all cases, the path C disappears when the model is positioned on the "Arc Position" or on the "Rose Position" as seen in FIG. 9.

What is claimed is:

1. A computer-implemented method comprising:
   displaying a geographical situation of an aircraft in flight on a visual display device using a first display mode, the first display mode including a symbol representing the aircraft, and the symbol being displayed in the first display mode as being situated at a first position that is at a bottom of a cartographic representation of terrain flown over by the aircraft in a space occupied by the aircraft at a current time;
   displaying the geographical situation of the aircraft in flight on the visual display device using a second display mode, the second display mode including the symbol representing the aircraft, and the symbol being displayed in the second display mode as being situated at a second position that is at a center of the cartographic representation of the terrain flown over by the aircraft in the space occupied by the aircraft at the current time;
   switching between displaying the first display mode and displaying the second display mode, wherein the first and second display modes are not displayed simultaneously, wherein the switching is performed in response to a set of operations being performed, and wherein the set of operations includes:
   selecting the symbol, wherein the symbol situated at the first position is selected when the first display mode is being displayed and wherein the symbol situated at the second position is selected when the second display mode is being displayed,
   displaying a path between the first position associated with the first display mode and the second position associated with the second display mode, and moving the symbol along the path between the first position and the second position, wherein the moving of the symbol causes a moving of the cartographic representation of the terrain flown over by the aircraft; and ceasing the displaying of the path between the first position and the second position, the ceasing of the displaying of the path between the first position and the second position being performed after performance of at least one of:
  the moving of the symbol along the path between the first position and the second position, or
  the switching between displaying the first display mode and displaying the second display mode.

2. The computer-implemented method of claim 1, wherein:
the selecting of the symbol is performed in response to a first input being received by a human-machine interface that is communicatively coupled to the visual display device; and
the moving of the symbol along the path between the first position and the second position is performed in response to a second input being received by the human-machine interface.

3. The computer-implemented method of claim 2, wherein the moving of the symbol along the path between the first position and the second position is performed automatically in response to a speed or an acceleration of the second input exceeding a predetermined value.

4. The computer-implemented method of claim 3, wherein the human-machine interface includes at least one of a graphic cursor control device or a touch-sensitive interface.

5. The computer-implemented method of claim 2, wherein the human-machine interface includes at least one of a graphic cursor control device or a touch-sensitive interface.

6. The computer-implemented method of claim 1, wherein the first display mode is designated as an Arc mode, wherein the second display mode is designated as a Rose mode, wherein the first position is designated as an Arc position, and wherein the second position is designated as a Rose position.

7. The computer-implemented method of claim 1, wherein the path between the first position and the second position is displayed in response to the selecting of the symbol.

8. The computer-implemented method of claim 1, wherein the moving of the model along the path between the first position and the second position is performed after the selecting of the symbol.

9. The computer-implemented method of claim 8, wherein the switching between displaying the first display mode and displaying the second display mode is performed after the moving of the symbol along the path between the first position and the second position.

10. A system comprising:
one or more computers of an aircraft; and
a visual display device of the aircraft communicatively coupled to the one or more computers,
wherein the system is configured to:
  display, by the visual display device, a geographical situation of the aircraft in flight on the visual display device using a first display mode, the first display mode including a symbol representing the aircraft, and the symbol being displayed in the first display mode as being situated at a first position that is at a bottom of a cartographic representation of terrain flown over by the aircraft in a space occupied by the aircraft at a current time;
  display, by the visual display device, the geographical situation of the aircraft in flight on the visual display device using a second display mode, the second display mode including the symbol representing the aircraft, and the symbol being displayed in the second display mode as being situated at a second position that is at a center of the cartographic representation of the terrain flown over by the aircraft in the space occupied by the aircraft at the current time;
  switch, by the one or more computers, between displaying the first display mode and displaying the second display mode, wherein the first and second display modes are not displayed simultaneously, wherein the switching is performed in response to a set of operations being performed, wherein the set of operations includes:
    selecting the symbol, wherein the symbol situated at the first position is selected when the first display mode is being displayed and wherein the symbol situated at the second position is selected when the second display mode is being displayed,
    displaying a path between the first position associated with the first display mode and the second position associated with the first display mode, and
    moving the symbol along the path between the first position and the second position, wherein the moving of the symbol causes a moving of the cartographic representation of the terrain flown over by the aircraft; and
  cease the displaying of the path between the first position and the second position, the ceasing of the displaying of the path between the first position and the second position being performed after performance of at least one of:
    the moving of the symbol along the path between the first position and the second position, or
    the switching between displaying the first display mode and displaying the second display mode.

11. The system of claim 10, further comprising:
a human-machine interface that is communicatively coupled to at least one of the visual display device or the one or more computers, wherein the system is further configured to perform the selecting of the symbol in response to a first input being received by the human-machine interface and wherein the system is further configured to perform the moving of the symbol along the path between the first position and the second position in response to a second input being received by the human-machine interface.

12. The system of claim 11, wherein the moving of the symbol along the path between the first position and the second position is performed automatically in response to a speed or an acceleration of the second input exceeding a predetermined value.

13. The system of claim 12, wherein the human-machine interface includes at least one of a graphic cursor control device or a touch-sensitive interface.

14. The system of claim 11, wherein the human-machine interface includes at least one of a graphic cursor control device or a touch-sensitive interface.

15. The system of claim 10, wherein the first display mode is designated as an Arc mode, wherein the second display mode is designated as a Rose mode, wherein the first position is designated as an Arc position, and wherein the second position is designated as a Rose position.

16. The system of claim 10, wherein the path between the first position and the second position is displayed in response to the selecting of the symbol.

17. The system of claim 10, wherein the moving of the model along the path between the first position and the second position is performed after the selecting of the symbol.

18. The system of claim 17, wherein the switching between displaying the first display mode and displaying the second display mode is performed after the moving of the symbol along the path between the first position and the second position.

* * * * *